United States Patent
Demol et al.

(10) Patent No.: US 10,595,631 B2
(45) Date of Patent: *Mar. 24, 2020

(54) GLASS-CERAMIC WORKTOP

(71) Applicant: EUROKERA S.N.C., Chateau-Thierry (FR)

(72) Inventors: Franck Demol, Reims (FR); Nicolas Roux, Chateau-Thierry (FR); Pablo Vilato, Paris (FR)

(73) Assignee: EUROKERA S.N.C., Chateau-Thierry (FR)

( * ) Notice: Subject to any disclaimer, the term of this patent is extended or adjusted under 35 U.S.C. 154(b) by 39 days.

This patent is subject to a terminal disclaimer.

(21) Appl. No.: 15/757,802

(22) PCT Filed: Sep. 6, 2016

(86) PCT No.: PCT/FR2016/052215
§ 371 (c)(1),
(2) Date: Mar. 6, 2018

(87) PCT Pub. No.: WO2017/042476
PCT Pub. Date: Mar. 16, 2017

(65) Prior Publication Data
US 2019/0246788 A1     Aug. 15, 2019

(30) Foreign Application Priority Data
Sep. 8, 2015   (FR) ...................... 15 58345

(51) Int. Cl.
*A47B 13/12*  (2006.01)
*A47B 96/18*  (2006.01)
(Continued)

(52) U.S. Cl.
CPC .............. *A47B 13/12* (2013.01); *A47B 96/18* (2013.01); *C03C 10/00* (2013.01); *F24C 7/082* (2013.01); *F24C 15/10* (2013.01)

(58) Field of Classification Search
CPC .......... A47B 13/12; F24C 7/082; F24C 15/10; C03C 10/00
(Continued)

(56) References Cited

U.S. PATENT DOCUMENTS 3,636,309 A  *  1/1972  Deaton .................... H02H 5/10
                                                219/446.1
5,746,114 A     5/1998  Harris
(Continued)

FOREIGN PATENT DOCUMENTS

DE           203 12 793 U1    1/2004
DE     20 2005 003 809 U1    8/2005
(Continued)

OTHER PUBLICATIONS

International Search Report dated Dec. 8, 2016, in PCT/FR2016/052215 filed Sep. 6, 2016.
(Continued)

*Primary Examiner* — Jose V Chen
(74) *Attorney, Agent, or Firm* — Oblon, McClelland, Maier & Neustadt, L.L.P.

(57) ABSTRACT

An item of equipment includes a worktop formed of at least one substrate made of transparent monolithic glass material with a surface area of greater than 0.7 m². The substrate exhibits a light transmission $T_L$ of greater than 10% and an opacity indicator between 5 and 90. The substrate is predominantly or completely bare or provided with coating(s) such that the substrate, thus coated, exhibits a haze of less than 15% and/or a light transmission $T_L$ of greater than 60% and/or an opacity indicator of less than 85. The item of equipment also includes a heating element and a light source to mark one or more zones or one or more elements or displays of the substrate. The item of equipment also includes at least one interface for communication with at
(Continued)

least one element of the worktop and/or with at least one external element for wireless communication.

20 Claims, 1 Drawing Sheet

(51) Int. Cl.
*C03C 10/00* (2006.01)
*F24C 15/10* (2006.01)
*F24C 7/08* (2006.01)

(58) Field of Classification Search
USPC .............. 108/50.11, 50.13, 23; 126/211
See application file for complete search history.

(56) References Cited

U.S. PATENT DOCUMENTS

| | | | | |
|---|---|---|---|---|
| 5,958,272 | A * | 9/1999 | Taplan | G01G 19/56 219/445.1 |
| 6,080,972 | A * | 6/2000 | May | A21B 1/02 219/486 |
| 6,118,107 | A * | 9/2000 | Kobrich | H05B 3/746 219/443.1 |
| 6,133,552 | A * | 10/2000 | Saulnier | G01J 5/041 219/446.1 |
| 6,350,971 | B1 * | 2/2002 | Smolenski | H05B 3/746 219/447.1 |
| 8,276,506 | B2 * | 10/2012 | Tojo | B25J 9/0003 99/325 |
| 8,362,906 | B1 | 1/2013 | Glassman et al. | |
| 8,420,984 | B2 * | 4/2013 | Kaiser | H05B 3/746 219/448.12 |
| 8,925,445 | B2 * | 1/2015 | Park | F24C 15/327 126/20 |
| 8,931,400 | B1 * | 1/2015 | Allen | H04Q 9/00 99/344 |
| 10,092,129 | B2 * | 10/2018 | Jenkins | A47J 27/62 |
| 10,154,757 | B2 * | 12/2018 | Veltrop | A47J 39/006 |
| 2002/0190057 | A1 | 12/2002 | Staebler et al. | |
| 2003/0034898 | A1 * | 2/2003 | Shamoon | G08C 17/02 340/12.22 |
| 2004/0007566 | A1 | 1/2004 | Staebler et al. | |
| 2005/0095430 | A1 | 5/2005 | Veerasamy | |
| 2007/0045278 | A1 * | 3/2007 | Dittrich | H05B 3/746 219/446.1 |
| 2007/0232476 | A1 | 10/2007 | Siebers et al. | |
| 2009/0142603 | A1 | 6/2009 | Veerasamy | |
| 2010/0101254 | A1 * | 4/2010 | Besore | G06Q 50/06 62/264 |
| 2010/0130342 | A1 | 5/2010 | Siebers et al. | |
| 2010/0186600 | A1 * | 7/2010 | Lewis | A47J 27/62 99/327 |
| 2010/0273002 | A1 | 10/2010 | Veerasamy | |
| 2013/0019638 | A1 | 1/2013 | Veerasamy | |
| 2013/0093575 | A1 | 4/2013 | Glassman et al. | |
| 2013/0256301 | A1 * | 10/2013 | Laurent | C03C 3/085 219/649 |
| 2013/0299856 | A1 | 11/2013 | Verger et al. | |
| 2014/0231406 | A1 * | 8/2014 | Tsang | A61M 5/44 219/394 |
| 2014/0345474 | A1 * | 11/2014 | Trench Rocha | A47J 43/04 99/325 |
| 2015/0001203 | A1 * | 1/2015 | Brown | F24C 7/082 219/391 |
| 2015/0042453 | A1 * | 2/2015 | Beifuss | F24C 7/082 340/5.64 |
| 2015/0253486 | A1 | 9/2015 | Verger et al. | |
| 2016/0120028 | A1 * | 4/2016 | Bach | H05K 1/0274 345/174 |
| 2018/0270911 | A1 * | 9/2018 | Debreyer | A47B 13/12 |
| 2018/0313544 | A1 * | 11/2018 | Lee | F24C 3/126 |

FOREIGN PATENT DOCUMENTS

| | | |
|---|---|---|
| DE | 20 2006 012 631 U1 | 11/2006 |
| DE | 10 2005 039 298 A1 | 2/2007 |
| DE | 20 2011 109 214 U1 | 3/2012 |
| EP | 1 272 007 A2 | 1/2003 |
| EP | 1 837 314 A1 | 9/2007 |
| EP | 2 217 036 A1 | 8/2010 |
| WO | 2012/098330 A1 | 7/2012 |
| WO | 2014/009630 A1 | 1/2014 |
| WO | 2014/108521 A1 | 7/2014 |

OTHER PUBLICATIONS

Anonymous: "Multimedia Countertop Lamps: Electrolux Ice", Internet URL:https://web.archive.org/web/201550602064726/htpp://www.trendhunter.com/trends/electrolux-ice, Jun. 2, 2015 XP055279784, 3 pages.
Wendy Ju et al., "CounterActive: An interactive Cookbook for the Kitchen Counter", MIT Media Lab, Proc. of 2001 Conference on Human Factors in Computing Systems, Internet <URL:http//www.media.mit.edu/pia/counteractive/counteractive-final.pdf>, Apr. 1, 2001, XP007906856, pp. 269-270.
Anonymous: "Living Kitchen 2015: Die Highlight, eKitchen", Internet <URL:http//www.ekitchen.de/kuechengeraete/news/living-kitchen-2015-44771.html>, Jan. 22, 2015, XP055279772, 3 pages.
Anonymous: "Beeindruckende neue Kuechenwelt", Internet <URL://http:www.schott-ceran.com/blog/beeindruckende-neue-kuechenwelt/>, Jan. 27, 2015, XP055281217, 5 pages.
BauknechtGlobal: "IMM/LivingKitchen 2015 Koeln—Bauknecht Interactive Kochflaeche/Interactive Cooktop (Deutsch)", Internet <URL:https://www.youtube.com/watch?v=67bcl0Xrtt8>, Jan. 27, 2015, XP054976592, pp. 1-1.
Whirlpool USA: "Whirlpool Interactive Cooktop at CES 2014", Internet <URL:https://www.youtube.com/watch?v=6FRhh50tXu4>, Jan. 9, 2014, XP002734990, 1 page.
Diana Barile, "0204 Supersedes All Previous Releases Product Information", Internet <URL:http://atkinsonsmirrorandglass.com/wp-content/uploads/2013/05/ROBAX-tech-specs.pdf>, Nov. 16, 2004, XP055279700, pp. 1-2.
Schott: "Schott Robax Home Tech Schott Robax Transparent Glass Ceramics for Extreme Temperature", Internet <URL:http://usktr.com/schott_robax.pdf>, Apr. 12, 2005, XP055279645, pp. 1-30.
Lux Glass: "Glass Worktops & Glass Cooker Splashbacks—Lux Glass" Internet <URL:https://web.archive.org/web/20150220013836/http://www.luxglassuk.co.uk/glass-worktops.php>, Feb. 20, 2015, XP055279600, 1 page.
Lux Glass: "Gallery of Our Work—Lux Glass", Internet <URL:https://web.archive.org/web/20150701170915/http://www.luxglassuk.co.uk/gallery.php>, Jul. 1, 2015, XP055279607, 3 pages.
Anonymous: "Glass Worktops for Kitchens Including a Nationwide Template and Installation Service", Internet <URL:https://web.archive.org/web/20150712912520/http://www.kitchencalm.co.uk/glasshome.htm>, Jul. 12, 2015, XP055279618, 5 pages.
Anonymous: "Kitchen Splashbacks in Glass and Kitchen Worktops in Glass—Technical Data", Internet <URL:https://web.archive.org/web/20150722055822/http://www.kitchencalm.co.uk/glasstechnical.htm>, Jul. 22, 2015, XP055279621, 3 pages.
Anonymous:"6x3 Designer Italian Glass Office Desk Range, Office Tables and Boardroom Tables", Internet <URL://https://web.archive.org/web/20150712005149//http://www.laporta.co.uk/products/desks_6x3.html>, Jul. 12, 2015, XP055279632, 6 pages.
Herwig Suheidler et al., "LI20-AL203-SI02 Glass-Ceramics", American Ceramic Society Bulletin, Amencan Ceramic Society, vol. 68, No. 11, Nov. 1, 1989, XP000126064, pp. 1926-1930.
Anonymous: "DTiM1000C Zoneless Piano Induction Hob Premium Induction Hob", Internet <URL:https://web.archive.org/web/20150815063410/http://www.dedietrich.co.uk/premium/93cm-zoneless-induction-hob-the-piano-p-20002126.html?cPath=155_123_138>, Aug. 15, 2015, XP055281949, 2 pages.
Bosch: "Bosch PKE611B17E Electric Cooktop", Internet: <URL:http://www.plumbingplace.co.uk/skin/common_files/images/ceramic-hob.pdf>, ,Mar. 25, 2014, XP055281940, 2 pages.

(56) References Cited

OTHER PUBLICATIONS

Lamona: "User & Installation Guide Ceramic 5 Zone Touch Control Hob Contents & Introduction", Internet <URL:https://www.howdens.com/media/library/pdf/2031.pdf>, Mar. 3, 2015, XP055281957, 24 pages.

Anonymous: "AGA 5 Oven Total Control Electric Range Cookers", Internet <URL:http://web.archive.org/web/20150506002054/http://www.agaliving.com/aga-range-cookers/range-cookers/aga-total-control/5-oven-aga-total-control#PRODUCTDETAILSTABARCHTYPE>, May 6, 2015, XP055281978, 3 pages.

\* cited by examiner

GLASS-CERAMIC WORKTOP

The present invention relates to a worktop, or work table or counter or piece of furniture, formed of at least one large-sized plate positioned or intended to be positioned horizontally on one or more supporting elements (casing of a piece of furniture, supporting leg(s)) in order to provide a stable surface intended for different uses. In particular, the present invention relates to a table or a piece of furniture exhibiting a surface or platform (generally horizontal in the position of use) capable of making possible, simultaneously or successively, different activities and/or support for objects (this surface or platform thus forming what is known as a worktop), in particular which can make possible the cooking or the reheating of food in appropriate containers and provide other uses.

The materials normally used to produce worktops are, for example, wood, quartz, Corian® and the like. For the cooking of food, there furthermore exist large-sized cooking surfaces in kitchens, in particular for professional use, these plates generally being metal and/or composite plates. In particular, there exist multilayer panels, based on ceramic layers or materials, such as stoneware, on metal layers or materials of aluminum type or on insulating plastic layers or materials of Bakelite type, these panels generally exhibiting a high thickness (of the order of 12 mm, for example) and being complex to produce.

At the same time, cooking tops made of materials of strengthened glass or glass-ceramic type, of more limited dimensions (in particular with a surface area generally of less than 0.4 m$^2$, it being possible for plates with a greater surface area to be more difficult to obtain by the processes normally used and to present problems in terms of flatness, handling, and the like), exist, in particular for domestic uses, the use of glass-ceramic material having become widespread in recent years for cooking plates, due in particular to the performance qualities of this material for this use and the attractive appearance of the plates produced.

There currently exist different types of glass-ceramic plates, each variant being the result of major studies and of numerous tests, given that it is very problematic to modify these plates and/or the process by which they are produced without the risk of having an unfavorable effect on the properties desired: in order to be able to be used as cooking plate, a glass-ceramic plate generally has to exhibit a transmission in the wavelengths of the visible region which is both sufficiently low to conceal at least a portion of the underlying heating elements when turned off and sufficiently high for, depending on the situation (radiant heating, induction heating and the like), the user to be able to visually detect the heating elements in the operating state for the purpose of safety; it should also exhibit a high transmission in the wavelengths of the infrared region in the case in particular of plates having radiant heating elements. The plates thus designed are intended exclusively for use as cooking plates and are conventionally neither intended to receive objects other than the heat-resistant utensils used for the cooking of food nor intended for the practice of activities other than the cooking of food.

The present invention has sought to widen the range of the existing household equipment products, having domestic or professional use, by developing interactive products of a novel type making possible more varied uses.

This aim has been achieved by the novel item of equipment or article or installation according to the invention, which is advantageously interactive, this item of furniture/household equipment (or piece of furniture) comprising:

- at least one worktop (or work counter or work table) formed of at least one substrate (in particular plate or surface or platform) made of (or based on or of a or essentially composed of a) transparent (exhibiting in particular a light transmission of greater than 10%) monolithic (or monoblock or with just one supporter) glass material (preferably made of glass-ceramic), which is advantageously essentially flat, with a surface area (length times width of its face with the greatest dimensions) of greater than 01 m$^2$, said substrate exhibiting a light transmission $T_L$ of greater than 10% and an opacity indicator of between 5 and 90, said substrate in particular being (predominantly, indeed even completely) bare (uncoated or provided with coating(s) over a limited portion of its surface, in particular over less than 10% of its surface) or provided with coating(s) such that the substrate, thus coated, exhibits a haze of less than 15% and/or a light transmission $T_L$ of greater than 60% and/or an opacity indicator of less than 85,
- at least one heating element (in particular under the substrate and hidden by the latter when this heating element is not in operation/is turned off),
- at least one light source, in particular intended to mark (render visible) one or more zones (such as heating zones) or one or more elements or displays (for example, an indicator of the operating state or a power indicator) of the substrate, this source occurring in particular straight above the substrate, for a display by projection, or under the substrate, for a display by transmission through the substrate,
- at least one interface for communication with at least one element of the top (for example with the light source(s) and/or the heating element(s)) and/or, if appropriate, with at least one external element (outside the top), for example with an external module (unit, device), for wireless communication,
- and optionally an element, in particular an (essentially) flat element, added to the substrate or worktop, in particular so that the assembly formed by the substrate (bare or, if appropriate, coated) or worktop and the added element exhibits a haze of greater than 15% and/or a light transmission $T_L$ of less than 60% and/or an opacity indicator of greater than 85.

The product developed according to the invention meets the desired aim, the present invention thus providing a novel interactive item of equipment (making possible in particular the activation of functions, such as the cooking of food, and the display of zones or data) which can be used just as well in the kitchen as in another habitable room, it being possible for the worktop to form part of an uninterrupted or interrupted piece of furniture, of a table, of a counter, and the like, this worktop being mounted or capable of being mounted horizontally on (in particular on the top of) one or more supporting elements (casing of a piece of furniture, supporting leg(s)) in order to provide a stable surface intended for different uses, the worktop or the item of equipment according to the invention exhibiting a continuous upper surface capable of making possible, simultaneously or successively, activities (such as work, games, reading, and the like), the support for objects (such as pieces of paper, computers, vases, dishes, and the like) and the preparation or the cooking or the reheating of food in appropriate containers.

More generally, the invention also relates to a worktop formed of at least one substrate made of transparent monolithic glass material with a surface area of greater than 0.7 m², said substrate exhibiting a light transmission $T_L$ of greater than 10% and an opacity indicator of between 5 and 90, and being predominantly or completely bare or provided with coating(s) such that the substrate, thus coated, exhibits a haze of less than 15% and/or a light transmission $T_L$ of greater than 60% and/or an opacity indicator of less than 85, the substrate optionally being coupled to an element added to the substrate or worktop, in particular so that the assembly formed by the substrate or worktop and the added element exhibits a haze of greater than 15% and/or a light transmission $T_L$ of less than 60% and/or an opacity indicator of greater than 85, this worktop being intended to equip a multiuse interactive piece of furniture or item of equipment (intended for multiple uses, such as are listed in the preceding paragraph), in particular as defined above according to the invention.

The invention also relates to the use of a substrate, in particular of a plate, made of transparent monolithic glass material with a surface area of greater than 0.7 m², said substrate exhibiting a light transmission $T_L$ of greater than 10% and an opacity indicator of between 5 and 90, and being predominantly or completely bare or provided with coating (s) such that the substrate, thus coated, exhibits a haze of less than 15% and/or a light transmission $T_L$ of greater than 60% and/or an opacity indicator of less than 85, as multiuse interactive worktop, in particular as mentioned in the paragraphs above.

As indicated above, the worktop is formed of a large-sized substrate or plate made of monolithic glass material (the glass material having been formed of a single block/as a single part, even though the substrate can, if appropriate, exhibit recesses, generally produced in the part after it has been formed, for esthetic or functional purposes), the advantage of such a large-sized monolithic plate being in particular that of providing a predominantly continuous/uniform/join-free surface which is attractive and easy to maintain, and also greater comfort of use and greater safety (in terms of impermeability, in the event of spilling liquids, and the like), and the like. The substrate essentially, indeed even solely, comprises the glass material, it being possible for this substrate/glass material, if appropriate, to be provided with thin decorative or functional coatings (in particular of the order of a few tens of nanometers to a few hundred microns, indeed even more, in thickness), for example made of enamel, paint, thin layers and the like, this coating or these coatings covering a limited portion of its surface, that is to say advantageously less than 10%, especially less than 5%, in particular less than 1%, of its surface, and/or being such that the substrate provided with this/these coating(s) exhibits a haze of less than 50% and/or a light transmission $T_L$ of greater than 60% and/or an opacity indicator of less than 85, as specified above.

Contrary to the practice in the field of glass-ceramics in particular, this (substrate made of) glass material is large-sized, its surface area (corresponding to the product of its length by its width for its face having the largest dimensions—generally its upper face, which is intended to be visible and to act as support for (household or working or cooking) articles) having dimensions of greater than 0.7 m², preferably of greater than 0.9 m², in particular of greater than 1 m² and especially of greater than or equal to 2 m². In point of fact, the manufacture of large plates, in the case of glass-ceramics in particular, presents numerous problems as regards flatness and handling. In the present invention, a large-sized plate, even so exhibiting a good flatness, can nevertheless advantageously be obtained by reducing the rate of passage (or lengthening the ceramization furnace or increasing the residence time in the furnace), with respect to the speed (or to the standard length of the furnace or to the standard time) normally used to obtain glass-ceramic plates of normal dimensions of less than 0.4 m², as explained subsequently in the process according to the invention.

In the present invention, the substrate made of glass material thus advantageously forms the major part (at least 50%), indeed even all, of the worktop or of its surface or face intended to be used for various purposes (generally upper face in the position of use). In particular, the substrate made of glass material advantageously occupies, in the present invention, at least 50%, in particular at least 70%, especially at least 90%, of the surface (generally measured on the upper face, intended to be visible and to be used as support for articles) of the worktop, and it generally occupies the entire surface of the worktop, the surface of the worktop being understood as the uninterrupted surface occupied by the worktop (surface which it occupies with the exclusion of that/those occupied by possible recesses (such as a recess in the top for incorporating a sink)) on the face under consideration (generally its upper face, intended to be visible and to act as support for articles), indeed even being understood in particular as the overall surface corresponding to the product of the length of the worktop by its width). Depending on the type of piece of furniture (in particular in the case of a piece of furniture where the worktop occupies the whole of one of its faces, generally the upper face, for example a table, a central island or a simple worktop), the substrate made of glass material can thus also occupy at least 50%, in particular at least 70%, especially at least 90%, of the surface of a face, in particular of the upper face (in the position of use), of the piece of furniture, indeed even occupy all of said surface.

Advantageously, the substrate made of glass material forms at least 50%, in particular at least 70%, especially at least 90%, indeed even the whole, of the worktop or, in other words, the worktop (generally on the upper face or forming the upper face of the piece of furniture) is mainly (to at least 50%, in particular at least 70%, especially at least 90%), in particular entirely (or solely), formed of (or constituted by the, or consists of the) substrate made of glass material (this glass material preferably being glass-ceramic).

The substrate/glass material according to the invention is advantageously flat (or predominantly or virtually flat) and in particular exhibits a flatness (height between the highest point and the lowest point of the substrate, with respect to the mean plane of the substrate, excluding any possible deliberate deformations produced on the substrate for esthetic or functional purposes) of less than 0.1% of the diagonal of the substrate and preferably of less than 3 mm, in particular of less than 2 mm, especially of less than 1 mm, indeed even of the order of zero, depending on the size/surface area/diagonal of the substrate, the flatness being measured using a SurFlat reference waviness meter sold by Visuol. The substrate is generally of geometric shape, in particular rectangular, indeed even square, indeed even circular or oval, and the like, and generally exhibits an "upper" face (face which is visible) in the position of use, another "lower" face (generally hidden, in the framework or casing of the piece of furniture incorporating the worktop) in the position of use, and an edge face (or edge or thickness). The upper face is generally flat and smooth but may also exhibit at least one protruding zone and/or at least one recessed zone and/or at least one opening and/or beveled edges (these shapes having been added during the manufacture of the substrate, for example by rolling, gravity bending or pressing, and the like, or having been added in off-line operations), and the like, these variations in shape advantageously constituting continuous variations in the plate (without change in materials or joins). The lower face can in particular be smooth or provided with tear drops increasing its mechanical strength and obtained, for example, by rolling.

The thickness of the monolithic substrate made of glass material used is generally at least 2 mm, in particular at least 2.5 mm, especially is of the order of 3 to 30 mm, and advantageously is less than 15 mm, especially is of the order of 3 to 15 mm and in particular of 3 to 10 mm.

The glass material of the substrate used is advantageously resistant to high temperatures and/or exhibits an expansion coefficient of zero or virtually zero (for example of less than $15 \cdot 10^{-7}$ $K^{-1}$) and in particular is advantageously glass-ceramic or a strengthened (in particular chemically or thermally tempered) glass. Preferably, the substrate is a substrate made of glass-ceramic and can, for example, be of the type of the plates sold under the KeraLite name by Eurokera. As defined according to the invention, the glass material is advantageously transparent, in particular exhibits a light transmission $T_L$ of greater than 10%, and also an opacity indicator of between 5 and 90, preferably of between 5 and 85. In an advantageous embodiment, it exhibits a light transmission $T_L$ of between 10% and 20%; in another advantageous form, it exhibits a light transmission $T_L$ of greater than 60%, in particular of greater than 70%.

The glass-ceramic used can in particular have a composition as described in the patent applications published under the following numbers: WO2013171288, US2010167903, WO2008065166, EP 2 086 895, JP2010510951, EP 2 086 896, WO2008065167, US2010099546, JP2010510952, EP 0 437 228, this glass-ceramic being in particular a lithium aluminosilicate glass-ceramic.

The glass-ceramic may be refined with arsenic (that is to say, have (a mother glass with) a composition comprising of the order of 0.2% to 1.5% by weight of arsenic oxide (expressed as $As_2O_3$)) or may not be refined with arsenic (in particular exhibiting a content of arsenic oxides of less than 0.2%, in particular of less than 0.1%, indeed even zero) or refined with tin or refined with sulfide(s), and may be obtained by rolling or by the float glass process.

The glass material can also be a nonceramized tempered glass, for example a tempered lithium aluminosilicate colored in its bulk, such as described in the patent applications published under the following numbers: FR 1 060 677 and WO2012080672, or else a tempered glass of another type (soda-lime, borosilicate, and the like), for example as described in the application published under the number WO2012146860.

The glass-ceramic or the tempered glass are obtained by the respective processes described in the abovementioned documents using the treatment temperatures and cycles which make it possible to obtain the glass material exhibiting the selected characteristics given in the definition of the invention. In the case of the glass-ceramics, these processes are preferably modified by reducing the rate of passage by at least 25%, preferably by at least 50%, or by increasing the length of the ceramization furnace or the residence time in said furnace by at least 25%, preferably by at least 50%, with respect to the rates, lengths and times, respectively, normally used, in order to obtain a large-sized flat substrate as required according to the invention, as explained subsequently. The substrate made of transparent glass-ceramic generally comprises crystals of β-quartz structure within a residual vitreous phase, the absolute value of its expansion coefficient advantageously being less than or equal to $15 \cdot 10^{-7}$/° C., indeed even $5 \cdot 10^{-7}$/° C., this glass-ceramic being, for example, that of the plates sold under the KeraLite name by Eurokera.

If appropriate, the glass material can also comprise colorants giving specific colorings to the substrate, for example vanadium oxide, iron oxide, cobalt oxide, cerium oxide, selenium oxide, chromium oxide, indeed even nickel oxide, copper oxide and/or manganese oxide, and the like.

As indicated in the definition of the invention, the substrate/glass material is bare or provided with a coating as defined above in the invention, it being possible for this substrate to be, in addition and if appropriate, coupled to an element added to the substrate or worktop, as indicated above, it being possible for this added element to act, for example, as reinforcer, or as masking means intended to mask at least a portion of the underlying elements (in particular heating means), and/or, if appropriate, it being possible for this added element to make it possible to confer an opacity/low transmission and/or a haze which are favorable to the display by light transmission through the substrate or to the display by light projection at the surface of the screen-forming substrate, as explained subsequently. Coupled is understood to mean that the element modifies the characteristics, for example optical or strength characteristics, of the substrate for the use thereof as worktop or in the item of equipment according to the invention. Added is understood to mean manufactured separately from the substrate (in contrast to a coating obtained by direct deposition on the substrate), it being possible for this element to be subsequently combined with the substrate or with the worktop by adhesive bonding, soldering, and the like, it being possible, if appropriate, for this element to be located at a distance from the substrate (for example from one to a few millimeters below) and not fixed to or against or on said substrate.

The coating, when it is present on the substrate, can, if appropriate, be provided in the form of at least one layer of enamel or of paint or of thin layers, over less than 10% of the surface of the substrate or so that the substrate provided with the coating exhibits a haze of less than 15% and/or a light transmission $T_L$ of greater than 60% and/or an opacity indicator of less than 85, as defined above.

The element added can, for example, be a slab or sheet of mica, of wood, of plywood, of laminate, of plastic (for example PVB—polyvinyl butyral—or polycarbonate or Bakelite, and the like), of glass, of stone, and the like, in particular with a thickness of 0.1 to 100 mm, and rendered integral with the substrate, for example by adhesive bonding, rolling, calendering, fixing to the same frame or to the same framework, it being possible for the added element to be placed against the substrate or at a distance (if appropriate using spacers and the like), the added element advantageously being coupled to the substrate while being under the latter (in the position of use).

When the added element is used, for example, as masking means intended to mask at least a portion of the underlying elements and/or makes it possible to confer an opaqueness and/or a haze which are favorable to the display by light transmission through the substrate or to the display by light projection at the surface of the screen forming substrate, it is preferably chosen so that the assembly formed by the substrate (bare or coated as defined above) or worktop and the added element exhibits a haze of greater than 15%, in particular of greater than 40%, indeed even of greater than 60%, and/or a light transmission $T_L$ of less than 60%, in particular of less than 50%, indeed even of less than 30% (this light transmission being in particular nonzero/greater than 0) and/or an opacity indicator of greater than 85, preferably of greater than 90 (and in particular of less than 100), over the majority (in particular over at least 80%, indeed even 90%, indeed even 100%) of its surface, except for possible localized decorations or localized components applied to its surface. When the added element acts as reinforcement, it is chosen, for example, for its good strength, and the like.

The haze measures the level of light scattering and is defined, in the context of the invention, as being the ratio of the diffuse transmission to the total transmission at a wavelength equal to 550 nm, this haze being evaluated, for example, using the spectrophotometer equipped with an integrating sphere used for the light transmission measurements.

The light transmission $T_L$ is measured according to the standard ISO 9050:2003 using the illuminant D65 and is the total transmission (integrated in the visible region), taking into account both direct transmission and possible diffuse transmission, the measurement being carried out, for example, using a spectrophotometer equipped with an integrating sphere, the measurement at a given thickness subsequently being converted, if appropriate, to the reference thickness of 4 mm according to the standard ISO 9050:2003.

The opacity indicator (or factor or coefficient) $\Omega$ is determined in the present invention by the formula $\Omega = 100 - \Delta E^*$ and is evaluated by measuring (colorimetry in reflection carried out using a Byk-Gardner Color Guide 45/0 colorimeter) the variation in color $\Delta E^*$, corresponding to the difference between the color, measured in reflection on the upper face of the substrate or of the assembly evaluated, for the substrate (respectively the assembly) placed on an opaque black background and the color for the substrate (respectively the assembly) placed on an opaque white background ($\Delta E^* = ((L_B^* - L_W^*)^2 + (a_B^* - a_W^*)^2 + (b_B^* - b_W^*)^2)^{1/2}$, according to the formula drawn up by the CIE in 1976, $L_W^*$, $a_W^*$ and $b_W^*$ being the color coordinates of the first measurement on the white background and $L_B^*$, $a_B^*$ and $b_B^*$ being those of the second measurement on the black background in the colorimetric system established by the CIE in 1976).

The assembly formed by the substrate and the optional added element according to the invention makes possible, if appropriate, a display by projection, as explained in detail subsequently, in particular, in combination with light sources placed above, makes it possible to display luminous zones for signaling in particular the cooking zones, when they are in the operating state, and/or makes possible, if appropriate, a display by light transmission by sources placed below, this assembly masking, in one and the same step, the elements placed below (such as the heating elements and cables). Conversely, the use of the bare or only slightly coated substrate, not coupled to an added element having a partially opacifying effect, makes it possible to get a better view of the inside of the item of equipment (for example the contents of drawers) or makes it possible to get a better view of display elements placed below (for example a screen making possible the display of data, information, recipes and the like).

As defined above, the article according to the invention also comprises at least one heating element, for example one or more radiant or halogen heating elements or one or more gas burners and/or one or more inductive heating means, these heating means generally being located under the worktop. The worktop of the article according to the invention can comprise one or more heating elements as well as one or more stove top burners. The term "stove top burner" is understood to mean a cooking location. The article according to the invention can comprise several types of heating elements or stove top burners (stove top gas burners, stove top radiant burners, halogen stove top burners or inductive stove top burners). Preferably, the article according to the invention comprises, as heating element(s), one or more inductive heating means.

The heating mean(s) can be located in a defined zone (for example on one end of the substrate) or several zones of the substrate or can be uniformly distributed under the substrate, for example occupying at least 25% of the surface area of the substrate, indeed even can occupy a surface area virtually equivalent to that of the substrate (for example more than 50%, in particular more than 75%, indeed even more than 85%, indeed even 100%, of the main surface area of the substrate), a plurality of small-sized inductors, for example, lining the substrate under its lower face, in order to make possible heating, if necessary, in any zone.

The cooking locations on the worktop, straight above the heating means, can, if appropriate, be signaled (or not, in the case, for example, of the use of a bare substrate or in the case of a top equipped with heating means covering the whole of its areal extent), on activation and/or permanently, in particular by means, respectively, of one or more light sources and/or by means of a permanent decoration, for example made of enamel. The patterns making it possible to signal the cooking zones (as well as patterns which may signal other zones or functions) can be larger or smaller in size; for example, they may be circles, each delimiting heating elements, or small patterns (triangles, crosses, and the like) at the center thereof or at the base thereof, and the like.

Preferably, the cooking locations (and/or, if appropriate, other zones and/or elements and/or functions and/or decorations) are signaled by at least one light source such as is mentioned in the definition of the invention, this source, once activated, indicating, for example, the location using a luminous pattern (in particular of disk, circle, cross, triangle, and the like, type) of fixed or variable color and/or dimensions. Alternatively, they can be indicated permanently by a fixed pattern (in particular of round circle, cross, triangle, and the like, type), in particular obtained by deposition of layer(s) (especially such as those used for the decoration of glass-ceramics), for example made of enamel or paint, at the surface of the plate (in particular on the upper face, or optionally lower face according to the type of coating).

In a preferred embodiment, and in particular when the assembly formed by the substrate and the optional added element is opaque or has a very low light transmission (in particular of less than 5%), the cooking location or locations (and/or, if appropriate, other zones and/or elements and/or functions and/or decorations) are signaled by, and/or demonstrated using or by means of, at least one light source as mentioned in the definition of the invention, on activation of said source, said source occurring above (in the position of use) or on the side of the visible face of the substrate (or else on the side where the display is desired or has to be seen) and making possible a light display by (direct) projection onto this screen-forming surface/face.

In another embodiment, for an assembly (formed by the substrate and the optional added element) exhibiting a light transmission $T_L$ of at least 5%, the cooking location or locations (and/or, if appropriate, other zones and/or elements and/or functions and/or decorations) can (additionally or alternatively) be signaled by, and/or demonstrated using or by means of, at least one light source as mentioned in the definition of the invention, on activation of said source, said source being placed under the assembly (in the position of use) and being hidden by the latter when turned off, said source making possible a light display by transmission through the worktop.

One or more light sources can also make possible the display of other elements or functions, for example the display of control means or zones (in the form of keys, logos, indeed even keyboards, and the like) or of indicators (of intensities/of power, of time, and the like), which are, for example, capable of being activated by contact on the surface of the top (using, for example, sensors located under the surface) or remotely (in particular by wireless communication), indeed even by simple movement of the hand (by sensors or detectors located, if appropriate, on the exterior and recording the movement, for example by triangulation, in order to convert it, in particular using a suitable algorithm and a suitable interface, into the activation of a function, for example), or, if appropriate, by placing a predetermined object (saucepan, and the like) at a predetermined location (such as a cooking zone) of the plate. The light source(s) can also make possible the display of decorations or of various data (display, for example, of computer pages, of cooking recipes, and the like) downloaded, for example, by wireless communication using an appropriate interface and projected or to transmitted from the light sources to the surface of the plate.

If appropriate, the article according to the invention can comprise several light sources, for the illumination of several zones or for the display of complex texts or decorations or in order to render the illumination uniform, it being possible for these sources to be positioned along different axes and angles of illumination in order to obtain the desired effect, without undesirable reflections or shades. In particular in the illumination by projection onto the screen-forming top, several sources are, for example, positioned so that the angle between each source (or between each element, for example mirror, sending the light toward the worktop) and the normal to the worktop is between 5° and 60° and preferably between 30° and 45°, in order to minimize the effects of shadows cast by a person using the worktop.

The light source(s) can advantageously be formed by light-emitting diodes, for reasons in particular of bulk, of effectiveness, of durability and of resistance to the surrounding conditions (heat, and the like), and/or can be other types of sources, for example halogen or incandescent lamps, lasers or liquid crystal screens, it being possible, if appropriate, for the sources to be used in combination with lenses or mirrors, and the like.

The diodes are advantageously of semiconductor chip type, made of inorganic materials (LEDs), emitting in particular in one direction, and can be encapsulated, that is to say comprise a semiconductor component and a package (for example made of resin of epoxy or nylon type) encapsulating the semiconductor component. These diodes can also be semiconductor chips without collimating lenses, for example of the order of about a hundred µm or a mm in size, optionally with a minimal (for example protective) encapsulation.

The diodes can, if appropriate, be carried by a support or bar or seat, it being possible for this seat to exhibit a (flat or inclined) surface which has been treated and/or rendered reflective for a better luminous efficiency, for example coated with a lacquer or paint and/or mirror layer, and/or coupled to a white or metal reflector in order to obtain better direction of the radiation emitted.

If appropriate, it is also possible to use organic light-emitting diodes (OLEDs), consisting in particular of a superimposition of organic semiconductor layers between electrodes and producing different colors to within one pixel according to the path taken by the electricity through the organic layers.

The assembling of each source or of the sources (with the substrate or with a support, for example with a portion of the item of equipment and/or an external part (associated with said item of equipment), such as a rail or a device suspended above the worktop (it being possible for this device to also include other components, such as a hood, it being possible for the source(s) in particular to be integrated into this hood)) can be carried out by soldering, clip fastening, adhesive bonding, and the like, if appropriate via another element; for example, it is possible to mount diodes, soldered to a support itself housed at the bottom of a metal profiled element, by clip fastening or adhesive bonding of the profiled element. The positioning of the source(s) (with respect to the plate in particular) is adjusted in order to make possible a display on the substrate (by projection (in particular from above) over the assembly formed by the substrate and the optional added element acting as screen, or through the substrate when the assembly is not completely opaque).

The sources, and their power supplies and actuating means, may or may not be split up so as to make possible simultaneous or individual illumination of the desired zones of illumination, according to requirements. Each source can be monochromatic (pure color) or polychromatic (mixed color).

"Monochromatic light source" is understood to mean a light source exhibiting a single emission peak in the visible wavelength range and such that the width of the peak varies from 1 to 100 nm and preferably from 5 to 50 nm.

"Polychromatic light source" is understood to mean a light source which exhibits at least two emission peaks at different wavelengths in the visible wavelength range. The color perceived (by the retina) then results from a mixing between the different wavelengths. It may be a question of an LED and/or of an LED display device, with an emission spectrum exhibiting a main emission peak and another emission peak, for example a fluorescence emission peak, which is wider than the main peak and generally of lower intensity. The polychromatic LED emits in particular according to a first emission (of high or of low intensity) comprised between 400 and 500 nm and according to a second emission (of high or of low intensity) in the visible region beyond 500 nm (case, for example, of LEDs formed of at least one electroluminescent crystal and of photoluminescent phosphor(s)). Use may in particular be made, as sources, of white LEDs, of LEDs having polychromatic emissions formed, for example, of three monochromatic sources with independently regulated intensities of "RGB" type (with three sources: red, green and blue), and the like.

One or more sources may also be integrated into or coupled with or combined with one or more display-type structures (for example comprising "7-segment" light-emitting diodes or liquid-crystal diodes), touch-sensitive electronic control panel or screen with digital display (if appropriate by wireless communication using an interface), or integrated into another device, such as a suction hood, as indicated above, and the like.

Apart from the source(s), the article according to the invention can also comprise at least one waveguide intended to propagate the light from one part of the article to the other (in particular by total internal reflection or by metallic reflection), if appropriate when the sources are placed under the worktop, each light source then being linked to the guide in question and interacting therewith by emitting its light radiation within it in order for the guide to transmit it, the light source(s) emitting/being coupled, for example, by the edge face or edge of the guide. This guide is advantageously clear or transparent and can be added (assembled after having been designed separately), for example under the lower face of the plate. It can be organic and/or plastic (for example made of polycarbonate or polymethyl methacrylate PMMA) or inorganic (for example, it can be made of glass). The article according to the invention can comprise several guides each dedicated to one or more zones of illumination, or a unitary guide provided, if appropriate, with openings. The guide can be assembled directly on the substrate or on another part of the item of equipment or of a support, for example can be rendered integral with the casing on which the worktop rests. The guide makes it possible, inter alia, to obtain better conduction of the light as far as the desired zones of illumination.

In the case in particular where one or more sources, if appropriate associated with at least one waveguide, are placed under the worktop, the item of equipment can also comprise, in the zone of illumination, at least one means for extracting the radiation emitted by the source(s), for example one or more scattering elements or treatments, in particular a layer added to the surface, and/or any differential treatment or texturing of the surface (local or over the entire surface) of the waveguide or of the extraction surface, such as laser etching, printing of enamel, chemical (acid, and the like) etching or mechanical attack (sandblasting, and the like), and the like. An extraction surface can, if appropriate, be provided in the thickness of the guide, for example according to an internal laser etching technology. The geometry and the roughness of the edge of a waveguide can also be machined in order to make possible local and controlled extraction of the light. The one or more extraction means make it possible to extract the radiation from the guide toward the desired zone of illumination. They can be combined, if appropriate, with another treatment which makes it possible to target the zones of illumination, for example with occulting screen printing (masking certain zones and preventing the passage of the light) deposited on a portion of a face of the substrate.

If appropriate, the item of equipment can also comprise at least one filter (coupled (in operation) to at least one source), so as to form a colored luminous region with a chosen color, this filter generally being positioned between the source and the plate and being able in particular to be combined (or rendered integral) with the source and/or with another intermediate element and/or with the plate.

"Filter" is understood to mean an optical filter (having an action on the transmission of the light), in particular a colored optical filter (the action on the transmission of the wavelength being carried out as a function of the wavelengths), this filter in particular being a generally flat element or material, in particular in the form of a film or layer or composite, based on at least one organic or inorganic material, which is (semi-)transparent (in the sense in particular that it is transparent at (a) certain wavelength(s) of the visible region and not transparent at/by blocking/by affecting other(s)), in particular making it possible to absorb and/or to reflect and/or to reemit certain wavelengths of the visible spectrum. This filter can in particular be a filter by absorption (the action on the transmission of the light occurring by absorption at certain wavelengths, it being possible for the absorbed light in particular to be converted into heat and/or emitted at other wavelengths) or a filter by reflection (the action on the transmission of the light occurring by reflection at certain wavelengths). The filter can be added to (manufactured separately) and combined with at least one light source and/or with another intermediate element or with the worktop, or it can be integrated into or produced directly on said source and/or said element and/or said top, for example in the form of a printed layer, for example printed by inkjet printing. The radiation emitted by the source passes through the corrective filter in order to produce the desired display on or through the substrate with which this assembly is combined, it being possible for the filter to make it possible to form different colors.

The item of equipment according to the invention, according to the sources used (and, if appropriate, the filters used) and their locations, can exhibit one or more luminous/display zones having a functional and/or decorative use, it being possible for said zone(s) to be in any zone of the plate (including heating zones), and it is possible to have several luminous/display zones which are different (different color, level of brightness), and/or each zone can itself exhibit different colors.

As indicated above, the item of equipment according to the invention also comprises at least one interface for communication with at least one element of the top (such as the light source(s) and/or the heating element(s)) and/or with an element external to the top, for example for wireless communication.

This (in particular man-machine or machine-machine) communication interface can be a device which makes it possible in particular to control or to transmit commands to the heating elements and/or to the light sources from or via control buttons or keys integrated into the worktop or offset onto an external element which is advantageously detachable or movable, in the case in particular of a command by wireless communication.

Preferably, the interface makes possible wireless communication with a unit external to the worktop (it being possible for this unit to form part of the item of equipment according to the invention and to itself constitute an interface), for example making possible the remote activation of the heating zones and/or of the light sources and/or the control of different functions (increase or decrease in the power or in the heating time, display of data on the worktop, and the like), the commands given by the external unit being transmitted by the interface to the relevant components of the item of equipment. The interface can also be a control interface located on the top (control panel) which transmits the commands by wires or optionally wirelessly to other components of the top or outside the top (for example to the sources offset from the top for the illumination by projection).

The external unit in the case of remote control can, for example, be in the form of a keyboard, a tablet, a touch screen or a cellphone, it being possible for this unit to be stationary (for example fastened to a wall) or movable (being able, if appropriate, to be placed on the worktop). This embodiment exhibits in particular the advantage of preventing finger marks (which are unsightly and obvious on glass materials) on the worktop or the cooking zones. Remote activation of the controls also makes it possible to reduce the risks of burns as the controls close to the cooking zones are not handled. For the sake of safety in particular, the wireless communication can advantageously be planned to be of limited range (for example range limited to the volume of the room in which the item of equipment is located) and/or equipped with safety features in order to prevent inadvertent activation by a person not present. The wireless communication in particular is achieved via electromagnetic or radio waves, if appropriate using systems of Bluetooth, WLAN, Wi-Fi, RFID chip, and the like, type.

The interface can make it possible to transmit different signals initiated by contact or even by movement in order to activate different components, as already mentioned (for example, it may convert a movement, detected by sensors by triangulation, these sensors being connected to this interface (and if appropriate forming part thereof), into the activation of a function (for example the increase in the heating power, illumination of the heating zones, and the like)). It can also make possible the downloading and/or the transmission of various data (such as Internet pages, screen backgrounds, cooking recipes, and the like), these data being, for example, transmitted to light sources making it possible in particular to display them at the surface of the worktop.

At least one interface is generally located on or under the worktop or close by. The item of equipment according to the invention can also comprise several interfaces, of the same type or different types, for example making possible the activation of different elements, or the item of equipment can comprise several interfaces, if appropriate functioning differently (of different composition, operating at different frequencies, and the like), for managing one and the same element (for example a heating zone) with a higher level of safety. If appropriate, there may in particular be provided an interface which makes it possible to coordinate the activation of the heating zones with the activation of the light sources. The interface can be formed of sensor(s), connector (s), control element(s), any other electrical or electronic or electromagnetic component, and the like.

Preferably, the item of equipment according to the invention comprises at least one interface for communication with at least one external element for the activation of different zones and/or functions of the substrate by wireless communication, in particular when the light transmission $T_L$ of the substrate is low.

Apart from the interface, the item of equipment or worktop can be equipped with different cables, connectors or other elements, in particular of electrical nature, which contribute to the transmission of commands from one part of the item of equipment to the other.

The item of equipment, in particular the worktop, according to the invention can also comprise various functional and/or decorative coatings as defined above according to the invention, in particular among those generally used with the glass materials in question, for example based on enamel, on paint, on thin (for example metal, dielectric, and the like) layer(s), and the like. For example, one of the faces of the substrate can comprise one or more enamel layers or one or more enamel patterns having a decorative purpose and/or in order to signal one or more elements (display devices, cooking zones, and the like) and/or acting as coloring layer and/or for other functions (as light extractor or to render the illumination uniform, and the like). In particular, the worktop can be equipped with a functional layer which confers on it one or more additional properties, such as anti-scratch, mechanical strengthening, anti-fingerprint, anti-overflow, and the like, properties. The coating can, for example, be formed by processes such as screen printing, cathode sputtering or pneumatic spraying deposition, inkjet printing, enamel jet printing, and the like, it being possible for the coating to be applied in particular, depending on the type of coating and on the desired function, to the visible face or to the opposite face.

As indicated above, the decorations (or at least a portion of them) or displays of the worktop can also advantageously be obtained by a light display (rather than by deposition of a coating), in particular by projecting light onto the screen-forming top, as already mentioned above.

The present invention also relates to a process for the manufacture of an item of equipment according to the invention, in particular of the worktop of said item of equipment, when this worktop is formed of at least one glass-ceramic substrate with a surface area of greater than $0.7 \text{ m}^2$, in which at least one cycle of ceramization of a glass plate with a surface area of greater than $0.7 \text{ m}^2$ is carried out in order to obtain said substrate, and according to which the rate of passage is reduced by at least 25%, preferably by at least 50%, or the length of the ceramization furnace or the residence time in said furnace is increased by at least 25%, preferably at least 50%, with respect to the optimal or normal rate, length or residence time respectively, in order to obtain a glass-ceramic substrate with a surface area of less than $0.4 \text{ m}^2$.

For the record, glass-ceramic plates are generally manufactured as follows: glass with the composition chosen for forming the glass-ceramic is melted in a melting furnace, the molten glass is then rolled to give a standard ribbon or sheet by passing the molten glass between forming rollers, and the glass ribbon is cut to the desired dimensions. Alternatively to the rolling, the glass can be produced by the float glass process, as described, for example, in the patent application WO2008056080, before, if appropriate, being cut up. The plates, already or not yet cut up, are subsequently ceramized in a way known per se, the ceramization consisting in baking the plates according to the temperature profile chosen in order to convert the glass into the polycrystalline material referred to as "glass-ceramic", the expansion coefficient of which is zero or virtually zero and which withstands a thermal shock which can range up to 700° C. The ceramization generally comprises a stage of gradual rise in the temperature up to the nucleation range, generally located in the vicinity of the range for transformation of the glass; a stage, lasting several minutes, of passing through the nucleation range; a new gradual rise in the temperature up to the temperature of the ceramization stationary phase; the maintenance of the temperature of the ceramization stationary phase for several minutes; and then a rapid cooling down to ambient temperature. If appropriate, the process also comprises a cutting operation (generally before ceramization), for example with a water jet, mechanical marking out with a cutting wheel, and the like, followed by a shaping operation (grinding, beveling, and the like). The process can also comprise a stage of rolling or gravity bending in order to form specific protrusions.

In the present invention, the glass-ceramic follows a ceramization cycle which gives it the desired properties, in particular a transparent appearance.

Other advantageous characteristics and details will emerge below from the description of a nonlimiting embodiment of the invention, with reference to the appended drawings, in which.

Figure 1:
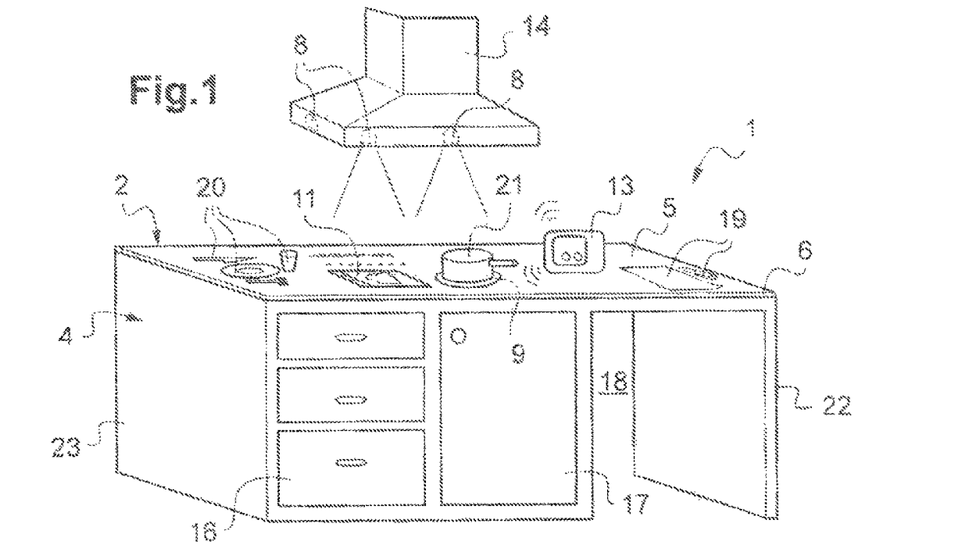
FIG. 1 represents a diagrammatic perspective view of an item of equipment according to the invention.
Figure 2:
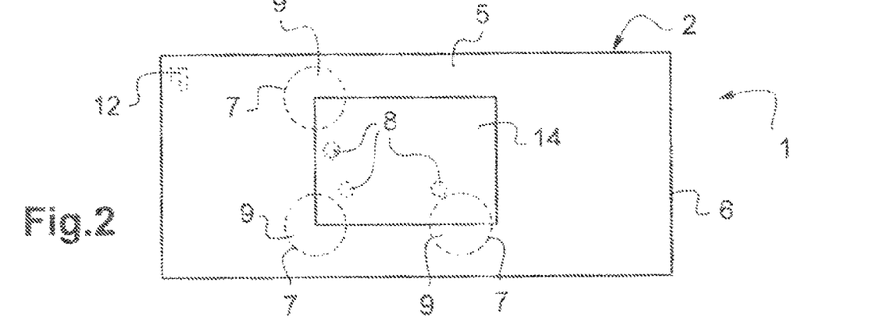
FIG. 2 represents a diagrammatic top view of a similar item of equipment (the utensils at the surface or the underlying elements of the piece of furniture not being represented)
Figure 3:
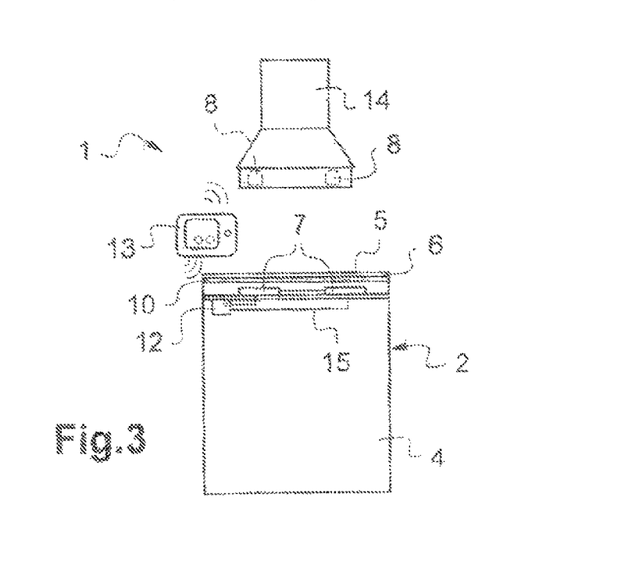
FIG. 3 represents a diagrammatic side view in which a section of the piece of furniture (23) has been removed in order to reveal certain components of the item of equipment.

In this example, the item of equipment (1) according to the invention comprises a piece of furniture (2) formed of a casing (4) surmounted by a worktop (5) formed of at least one substrate made of glass-ceramic with a surface area of 3.4 m², this substrate occupying the majority (in this instance all) of the surface (measured on the upper face) of the worktop and being formed of a transparent (monolithic) glass-ceramic plate (6), this plate/this substrate made of glass-ceramic optionally being coupled to an added element (10) in the form of a mica slab with a thickness of 0.75 mm, the glass-ceramic plate being of the type of that sold under the KeraLite reference by Eurokera, this plate exhibiting a smooth upper face and a smooth lower face (it also being possible for this face to be provided with tear drops) and a thickness of 5 mm, and exhibiting a light transmission $T_L$ of 87.78% and an opacity indicator of 26.83 (the assembly formed by the substrate and the mica slab exhibiting a light transmission $T_L$ of 0.01% and an opacity indicator of 100). The substrate is, for example, obtained by reducing, in the process for the manufacture of glass-ceramics of KeraLite type, the rate of passage in the ceramization furnace by 50%.

The substrate made of glass-ceramic obtained exhibits a flatness of less than 2 mm (the flatness obtained being between 2 and 3 mm for a rate reduced by only 25% and being more than 15 mm for a rate unchanged with respect to that used in the abovementioned patent application in order to obtain a plate with standard dimensions of less than 0.4 m²), the flatness desired for good optical properties and good coupling and thermal efficiency properties in particular being less than 3 mm and preferably less than 2 mm.

The item of equipment additionally comprises, in the present example, three heating elements (7), for example inductors, positioned under the plate (6). These inductors are, in the present case, distributed in the middle of the work surface but might just as easily be located at one end of the top.

The item of equipment also comprises three light sources (8) intended to signal the cooking locations and placed above the substrate (and overhanging the worktop). These sources make it possible to signal the cooking locations, for example using a luminous disk or circle of color (9) delimiting each location (it being possible for the colors, if appropriate, to be identical or different according to the locations) and encircling the inductors, when these sources are activated, indeed even when the heating elements are activated if the sources are connected to said elements by an appropriate interface. The sources (8) are formed, for example, of a plurality of LEDs carried by a seat housed in a profiled element and are, for example, integrated in a suction hood (14) overhanging the worktop. These sources, apart from the signaling of the heating zones, can also or alternatively be used for the illumination (local or complete) of the worktop or for the display by projection of various items of information, such as the display of data, of cooking recipes (11), and the like.

The item of equipment additionally comprises at least one interface (12) (hidden by the substrate) for communication with the heating elements and, if appropriate, with the light sources, this interface also communicating wirelessly with an external unit in the form, for example, of a touch tablet (13) for the activation of different zones and functions of the plate or of the item of equipment. The external unit can be advantageously movable and lie on the worktop (FIG. 1) or be used for the remote activation (FIG. 3) of different zones or functions. Alternatively or cumulatively, the interface might also comprise or be connected to a permanent control panel located on the surface of the substrate (2) for the activation of different zones and functions, in particular of the substrate.

The item of equipment also comprises other elements, in particular electrical cables (15) for the activation of the heating elements and for the activation of the sources, and comprises drawers (16) or cupboards (17) inserted into the casing supporting the worktop, for storing various articles, and the like. The item of equipment can also comprise other elements; for example, the worktop can comprise a trim, the substrate can be coated with an decoration, for example made of enamel, the casing can be uninterrupted or comprise different recesses (such as the recess (18)) or integrate other elements (for example a built-in oven, and the like). The worktop (5) can be used for different purposes, such as writing (as symbolized by the paper and the pen (19)), the support for objects (as symbolized by the tableware (20)), while making possible the cooking of food (as symbolized by the cooking receptacles (21)), and the like. If appropriate, the casing can also be replaced by supporting legs (for example only the walls 22 and 23, or four legs at the four corners, the item of equipment under the worktop in this case preferably being hidden by a localized enclosure with a thickness of a few centimeters under the substrate), such as a table.

The item of equipment according to the invention can in particular be advantageously used to produce a new range of interactive and multiuse pieces of furniture in particular integrating cooking zones or a cooking function.

The invention claimed is:

1. An item of equipment, comprising:
    at least one worktop formed of at least one substrate made of transparent monolithic glass material with a surface area of greater than 0.7 m², said substrate exhibiting a light transmission $T_L$ of greater than 10% and an opacity indicator of between 5 and 90, said substrate being predominantly or completely bare or provided with coating(s) such that the substrate, thus coated, exhibits a haze of less than 15% and/or a light transmission $T_L$ of greater than 60% and/or an opacity indicator of less than 85;
    at least one heating element;
    at least one light source configured to mark one or more zones or one or more elements or displays of the substrate, the at least one light source occurring straight above the substrate, for a display by projection, or under the substrate, for a display by transmission through the substrate; and
    at least one interface for communication with at least one element of the worktop and/or with at least one external element for wireless communication.

2. The item of equipment as claimed in claim 1, wherein the surface area of the substrate made of glass material is greater than 0.9 m², the thickness of said substrate is at least 2 mm, and the thickness of the substrate is less than 15 mm.

3. The item of equipment as claimed in claim 1, wherein the substrate made of glass material occupies at least 50% of the surface area of the worktop.

4. The item of equipment as claimed in claim 1, wherein the substrate is made of tempered glass or of glass-ceramic.

5. The item of equipment as claimed in claim 1, wherein the substrate exhibits a flatness of less than 0.1% of the diagonal of the substrate.

6. The item of equipment as claimed in claim 1, wherein the glass material exhibits a light transmission $T_L$ of between 10% and 20% or of greater than 60%.

7. The item of equipment as claimed in claim 1, wherein the glass material comprises colorants.

8. The item of equipment as claimed in claim 1, wherein the item of equipment comprises, as the at least one heating element, one or more inductive heating means, the at least one heating element being located in one or more zones of the substrate or uniformly distributed under the substrate.

9. The item of equipment as claimed in claim 1, wherein one or more cooking locations on the worktop and/or other zones and/or elements and/or functions and/or decorations are signaled, on activation and/or permanently, by the at least one light source and/or by a permanent decoration.

10. The item of equipment as claimed in claim 9, wherein the cooking location or locations and/or other zones and/or elements and/or functions and/or decorations are signaled by and/or demonstrated by the at least one light source, on activation of said at least one light source, said at least one light source being placed above the substrate or on the side of the visible face of the substrate or on the side where the display is desired or has to be seen, and the at least one light source is configured to produce a light display by projection onto the screen-forming face.

11. The item of equipment as claimed in claim 9, wherein the cooking location or locations and/or other zones and/or elements and/or functions and/or decorations are signaled by and/or demonstrated by the at least one light source, on activation of said at least one light source, said at least one light source being placed under the substrate, said at least one light source being configured to produce a light display by transmission through the worktop.

12. The item of equipment as claimed in claim 1, wherein the at least one light source or other component(s) of the item of equipment are capable of being activated by contact on the surface of the worktop and/or on the interface and/or on an external unit, or by movement.

13. The item of equipment as claimed in claim 1, wherein the at least one light source includes several light sources which are positioned so that the angle between each of the several light sources, or between each element sending the light toward the worktop, and the normal to the worktop is between 5° and 60° to minimize the effects of shadows cast by a person using the worktop.

14. The item of equipment as claimed in claim 1, wherein the interface enables wireless communication with a unit external to the worktop to remotely active the at least one heating element and/or the at least one light source and/or to control different functions of the item of equipment.

15. The item of equipment as claimed in claim 1, wherein the interface is configured to transmit different signals initiated by contact or movement in order to activate different components of the item of equipment and/or to download and/or transmit data.

16. The item of equipment as claimed in claim 1, wherein the item of equipment comprises one or more interfaces that are configured to manage one or more elements of the item of equipment or to coordinate the activation of the at least one heating element with the activation of the at least one light source.

17. The item of equipment as claimed in claim 1, wherein the worktop comprises at least one added element for example in the form of a slab of mica, of wood, of plywood, of laminate, of plastic, of glass or of stone.

18. The item of equipment as claimed in claim 1, wherein the worktop is mounted on at least one or more supporting elements thus forming, with said supporting elements, a table, an uninterrupted or interrupted piece of furniture, or a counter.

19. A worktop, comprising:
at least one substrate made of transparent monolithic glass material with a surface area of greater than 0.7 m$^2$, said substrate exhibiting a light transmission $T_L$ of greater than 10% and an opacity indicator of between 5 and 90, said substrate being predominantly or completely bare or provided with one or more coatings such that the substrate, thus coated, exhibits a haze of less than 15% and/or a light transmission $T_L$ of greater than 60% and/or an opacity indicator of less than 85.

20. A method, comprising:
obtaining a substrate made of transparent monolithic glass material with a surface area of greater than 0.7 m$^2$, said substrate exhibiting a light transmission $T_L$ of greater than 10% and an opacity indicator of between 5 and 90, said substrate being predominantly or completely bare or provided with one or more coatings such that the substrate, thus coated, exhibits a haze of less than 15% and/or a light transmission $T_L$ of greater than 60% and/or an opacity indicator of less than 85; and
using the substrate with the item of equipment as claimed in claim 1.

* * * * *